United States Patent [19]
Himuro

[11] Patent Number: 4,984,001
[45] Date of Patent: Jan. 8, 1991

[54] FOCAL LENGTH DISPLAY DEVICE OF CAMERA

[75] Inventor: Keiji Himuro, Tokyo, Japan

[73] Assignee: Ricoh Company, Ltd., Tokyo, Japan

[21] Appl. No.: 457,834

[22] Filed: Dec. 27, 1989

[30] Foreign Application Priority Data

May 13, 1989 [JP] Japan ................. 1-55194[U]
Sep. 11, 1989 [JP] Japan ................. 1-106354[U]

[51] Int. Cl.$^5$ ............................................. G03B 3/00
[52] U.S. Cl. .............................. 354/195.12; 354/195.13
[58] Field of Search ............ 354/195.1, 195.12, 195.13

[56] References Cited

U.S. PATENT DOCUMENTS 4,933,692 6/1990 Kudo et al. ................. 354/195.12

Primary Examiner—Michael L. Gellner
Attorney, Agent, or Firm—Oblon, Spivak, McClelland, Maier & Neustadt

[57] ABSTRACT

A focal length display device of a camera that comprises a zoom lens unit having a lens group movable on an optical axis driven by a driver. An optical converter having a magnification can be attached to the zoom lens. A detector detects a position of the lens group and outputs a signal of lens position information data which is converted to a digital signal by an A/D converter. A detector circuit detects a state whether the optical converter is attached to the zoom lens unit or not. A focal length calculation circuit calculates the focal length in such a way than, when the detector circuit detects the state in which the optical converter is not attached, the focal length is calculated in response to the lens position, while when the detector circuit detects the state in which the optical converter is attached, the focal length is calculated in response to the lens position and the magnification of the optical converter. The calculated focal length is displayed on a display device.

3 Claims, 8 Drawing Sheets

FOCAL LENGTH DISPLAY DEVICE OF CAMERA

BACKGROUND OF THE INVENTION

1. Field of the Invention

The present invention relates to a focal length display device of a camera. More particularly, the invention relates to a focal length display device of a camera which comprises a zoom lens which is continuously varifocal due to a variable power function of a group of lenses arranged on a same optical axis and to which camera a plurality of converters such as a tele-converter and a wide-converter are attachable wherein the focal length of each of the converters can be visually confirmed.

2. Description of the Related Art

There have been used a single focus camera and a double focus camera comprising a telephotolens and a wide angle lens selectably provided thereto. With respect to such a single focus camera and the double focus camera, the focal distance at each shot is not the matter, since the user of the camera only need to know the single focal length of the camera or those of the telephotolens and the wide angle lens, respectively, of the double focus camera.

Also, when the tele-converter or the wide-converter is attached to the single focus camera or the double focus camera, the focal length of the camera can be easily calculated by multiplying the focul length of the camera by the magnification of the tele-converter or the wide-converter. Therefore, it is unnecessary to display the focal length of the camera at the time of taking an object.

For the reason mentioned above, the single focus camera or the double focus camera does not comprise a means for displaying the focal length thereof.

On the other hand, with respect to the camera which uses a variable power lens such as a zoom lens or a varifocal lens as an objective, the camera comprises a focal length display device which is constructed for example in such a way that an operator (user) can confirm the focal length by moving a reference mark (index) pressed on a barrel of the variable power lens and reading the scale of the focal length indicated by the index.

However, further convenient focal length display devices are being required since the zoom lenses are widely used nowadays which enables to take photos at a desired focal length within the range of the zoom lens.

Japanese Utility Model Application Laying Open (KOKAI) No. 63-10713 discloses a focal length display device which mechanically displays the focal length of the camera.

Also, Japanese Utility Model Application Laying Open (KOKAI) No. 63-174337 discloses a focal length display device which electrically displays the focal length of the camera. This electric display device comprises an objective system which has a zoom function and is mounted on a body and a zoom display unit which is provided on the body and arranged in such a way that the zooming characteristic factors such as focal length, field angle and magnification of the zoom lens are converted to electric signals and displayed numerically in a liquid crystal display.

The zoom lens camera provided with the electric focal length display unit mentioned above is very convenient to use since the focal length is displayed in the liquid crystal display according as the zoom lens barrel is rotated and index position thereof is shifted.

To enlarge the variable range of the zooming function, there are some cameras that comprise a zoom lens to which a tele-converter or a wide-converter can be attached. However, such a camera is not constructed so that the focal length is displayed at the time when the tele-converter or the wide-converter is attached to the zoom lens.

The tele-converter has a magnification of for example, 1.4, 1.5 or 2. Also, the wide-converter has a magnification of for example, 0.7 or 0.5. When a tele-converter having a magnification of a whole number times for example 2 times is attached, the user can easily calculate the focal length of the zoom lens combined with the tele-converter simply by multiplying the displayed numeral by 2. However, it is not that easy with respect to a converter having a magnification of a decimal fraction number, for example a tele-converter having a magnification of 1.4 or a wide-converter having a magnification of 0.7.

Especially, with respect to the zoom lens, the focal length thereof is continuously variable, which makes it difficult to know the focal length of the zoom lens combined with the converter at the time when the magnification of the zoom lens is changed from the display of the focal length of the zoom lens.

SUMMARY OF THE INVENTION

It is therefore an object of the present invention to provide a focal length display device of a camera considering the above-mentioned points which device makes it possible to display the focal length of the camera at any magnification of the zoom lens combined with a converter so that the user can directly and visually confirm the focal length of the objective lens system at any time of operating the zoom system without referring to a manual guide of the converter or calculating the focal length by maltiplying the displayed numeral by the magnification of the converter.

The object of the invention can be achieved by a focal length display device of a camera comprising: a zoom lens which comprises a group of lenses disposed on a same optical axis and has a focal length which is continuously variable due to a variable power function of the group of lenses; a drive system for driving the group of lenses of the zoom lens; a lens position detection system which detects the position of the group of lenses on the optical axis and outputs an information signal in response to the position of the group of lenses detected thereby; an information converter system which converts the information signal transmitted from the lens position detection system to a numerical value; a converter detection system which detects whether a converter having a magnification is attached to the zoom lens or not and identifies the converter; a focal length calculation system which calculates the focal length in such a way that, when the converter detection system detects absence of the converter, the focal length is calculated in response to the output from the information converter system, whereas when the converter detection system detects a state wherein a converter is attached to the zoom lens, the focal length is calculated in response to the magnification of the converter and on the basis of the output from the information converter system; and a display system which displays the focal length calculation result output from the calculation system.

In accordance with the structure of the focal length display device of a camera mentioned above, when the converter detection system does not detect a tele-converter or a wide-converter attached to the zoom lens, the lens position detection system detects the position of the lens group which is driven to move by the drive system so that the focal length is calculated from the information of the lens position by the focal length calculation system and that the calculation result is displayed by the display system. On the other hand, when the converter detection system detects a tele-converter or a wide-converter attached to the zoom lens, the lens position detection system detects the podition of the lens group so that the focal length calculation system calculates the focal length from the information of the lens position and the magnification of the converter so as to obtain the focal length which is compensated for the magnification of the converter and that the calculation result is displayed by the display system.

An advantage of the above-mentioned focal length display device of a camera is that due to the structure and function thereof mentioned above, it becomes possible to display the focal length of the camera when a tele-converter or a wide-converter is attached to the zoom lens with a compact structure which can be realized at a low cost so that the user of the camera can clearly and reliably confirm the focal length from the display at each time he or she uses the zoom lens combined with a converter lens system without referring to the manual guide of the converter lens system or doing calculation of multiplying the displayed numerical value in the display by the magnification of the converter lens, which makes it possible to realize a focal length display device which is very convenient to use.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter with reference to the drawings.

Figure 1:
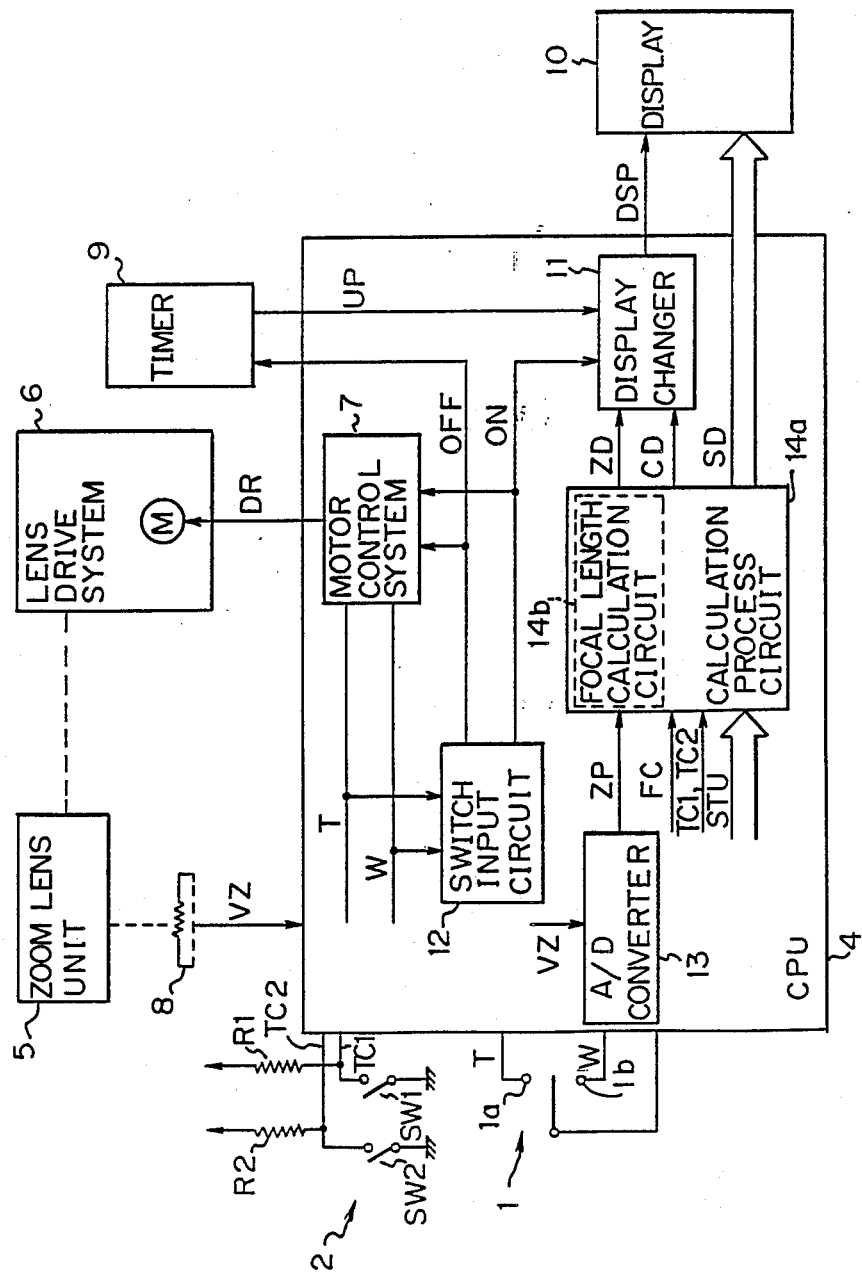
FIG. 1 is a block diagram representing a whole structure of an embodiment of the focal length display device of a camera in accordance with the present invention.

FIG. 1 illustrates a block diagram representing a whole structure of an embodiment of the focal length display device of a camera in accordance with the present invention.

In FIG. 1, numeral 1 designates an up-down switch comprising an up switch contact 1a and a down switch contact 1b. The up-down switch 1 is arranged to drive a zoom lens unit 5 when manipulated by an operator. When the up switch contact 1a is turned on, a signal T corresponding to a tele-converter (referred to as a tele signal T hereinafter) is output therefrom while when the down switch contact 1b is turned on , a signal W corresponding to a wide-converter (referred to as a wide signal W hereinafter) is output therefrom.

Numeral 2 designates a converter detection means comprising two converter switches SW1 and SW2.

An example of the converter discrimination logic in response to the on-off state of the converter switches SW1 and SW2 is represented in the following table 1.

TABLE 1

| | | Converter Switch SW1 | |
|---|---|---|---|
| | | On | Off |
| Converter Switch SW2 | On | Wide Converter 1 | Tele Converter |
| | Off | Wide Converter 2 | Normal |

Figure 2:
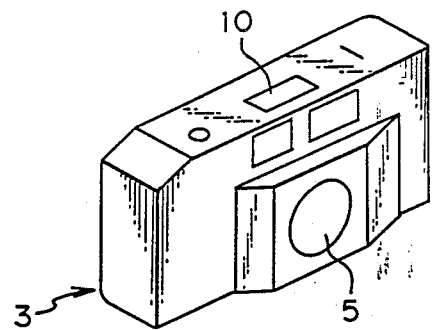
FIG. 2 is an outer perspective view of a camera which is provided with the embodiment of the focal length display device of FIG. 1.

In accordance with the table 1 mentioned above, when the two converter switches SW1 and SW2 both are turned on, the state of the camera is discriminated as a state wherein a wide-converter 1 having a magnification of for example 0.7 is attached to the camera 3 (see FIG. 2).

Also, when the converter switch SW1 is turned on while the other converter switch SW2 is turned off, the state of the camera is discriminated as a state wherein another wide-converter 2 having a magnification of for example 0.5 is attached to the camera 3.

Further, when the converter switch SW1 is turned off while the other converter switch SW2 is turned on, the state of the camera is discriminated as a state wherein a tele-converter having a magnification of for example 1.5 is attached to the camera 3.

On the other hand, when the two converter switches SW1 and SW2 both are turned off, the state of the camera is discriminated as a state of being normal wherein none of a tele-converter and a wide-converter are attached to the camera 3.

The converter switches SW1 and SW2 are connected to pull-up resistances R1 and R2, respectively. When each of the converter switches SW1 and SW2 is turned off, the connecting point of each of the respective pull-up resistances R1 and R2 becomes level "H", while when each of the converter switches SW1 and SW2 is turned on, the connecting point of each of the respective pull-up resistances R1 and R2 becomes level "L". Converter detection signals TC1 and TC2, each being level "H" or level "L" according to the state of the switches SW1 and SW2, are generated and transmitted from the connecting points between each of the switches SW1 and SW2 and the each of the corresponding resistances R1 and R2, respectively.

Figures 5A, 5B, 5C:
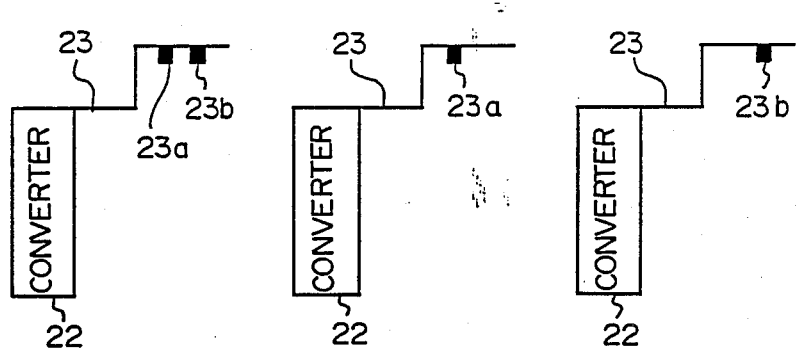
FIG. 5a is a schematic side view of an example of the converter structure applied to the embodiment of the focal length display device of FIG. 1.
FIG. 5b is a schematic side view of another example of the converter structure applied to the embodiment of the focal length display device of FIG. 1.
FIG. 5c is a schematic side view of still another example of the converter structure applied to the embodiment of the focal length display device of FIG. 1.
Figure 6:
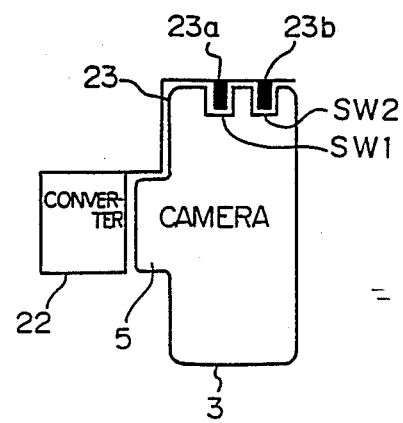
FIG. 6 is a schematic side view of a camera to which the converter of FIG. 5a is applied.

FIG. 5a illustrates a side view of an example of the converter 22. The converter 22 comprises a frame 23 which is made from for example a plastic material and formed integrally in one unit with the converter 22 itself. The converter frame 23 is attached to an upper portion of the camera 3, as illustrated in FIG. 6, so that the converter 22 covers the front face of the zoom lens unit 5 of the camera 3.

The converter frame 23 comprises signal pins 23a and 23b, each projecting downward therefrom in the drawing. The pins 23a and 23b actuate the above-mentioned switches SW1 and SW2, respectively.

Each of the pins 23a and 23b is arranged at a predetermined position of the frame 23 corresponding to the kind of converter 22 so that the converter 22 can be discriminated from the on off state of switches SW1 and SW2, respectively, as mentioned above.

In the structure of FIG. 5a, the pins 23a and 23b are disposed on the same side of the frame 23 in parallel to each other so that when the converter 22 is attached to the camera, both of the switches SW1 and SW2 are turned on.

On the other hand, in the structure of FIG. 5b, only the front side signal pin 23a is provided on the frame 23, so that when the converter 22 is attached to the camera, only the switch SW1 is turned on.

Further, in the structure of FIG. 5c, only the rear side signal pin 23b is provided on the frame 23, so that when the converter 22 is attached to the camera, only the switch SW2 is turned on.

FIG. 6 schematically illustrates a camera 3 to which the converter 22 of FIG. 5a is attached. The signal pins 23a and 23b disposed side by side on the same side of the frame 23 actuate the switches SW1 and SW2 of the camera, respectively, so that the both switches SW1 and SW2 are turned on.

As can be seen from FIG. 6, the switches SW1 and SW2 are disposed on the same side of the upper portion of the camera in the drawing at positions corresponding to the signal pins 23a and 23b of the converter frame 23, respectively, so that when one of the converters 22 of FIGS. 5a to 5c is attached to the camera, the pin 23a and/or pin 23b actuates the switch SW1 and/or switch SW2 according to the kind of converter 22 attached to the camera.

When the camera is in a state of normal operation, that is, when the converter 22 is not attached to the camera 3, both switches SW1 and SW2 are turned off.

It is to be noted that the above-mentioned converter switch 2 comprising the switches SW1 and SW2 is also used for autofocus correction in the autofocus operation.

The outputs from the up-down switch 1 and the converter switch 2 are transmitted to a central processing unit (CPU) 4. The CPU 4 executes all of sequence control of the camera such as shutter control, motor drive control and time measurement control. The CPU 4 also comprises a calculation unit.

The above-mentioned zoom lens unit 5 comprises a group of lenses which are disposed on a same optical axis and constitute a variable power lens unit. The lens group of the zoom lens unit 5 is driven by a lens drive system 6 maintaining a predetermined relation between the lenses.

The lens drive system 6 comprises a motor M which is driven to rotate by a drive signal DR output from a motor control system 7 installed within the CPU 4 and drives the lens group of the zoom lens unit 5 through a not shown mechanical transmission system. The position of the lens group of the zoom lens unit 5 is detected by a lens position detection means comprising a zoom detection resistor (variable resistor such as a potentiometer) 8. The resistor 8 detects the position of the zoom lens and transmits a voltage value signal VZ to the CPU 4 as an information signal of the lens position corresponding to the focal length of the zoom lens.

Numeral 9 designates a timer device which starts measurement of time when it receives a release signal (OFF) and outputs an end signal (UP) to the CPU 4 when the measurement reaches a predetermined value.

Numeral 10 designates a display device which displays a predetermined information upon receipt of a display signal DSP from a display changer circuit 11 described later installed in the CPU 4. The display device 10 comprises a liquid crystal display (LCD) which is disposed on an upper surface of the camera 3, as illustrated in FIG. 2. The display 10 is illustrated in detail in FIG. 3 and further described later.

The CPU 4 receives the above-mentioned tele signal T, the wide signal W, the voltage signal VZ and the converter detection signals TC1 and TC2 and outputs the above-mentioned drive signal DR and the display signal DSP.

The control function of the CPU 4 is further described hereinafter referring to each constituent thereof.

First, the motor control system 7 receives the tele signal T and wide signal W transmitted from the up-down switch 1 and the release signal OFF and an operation signal ON transmitted from the switch input circuit 12. Upon receipt of these signals, the motor control system 7 outputs a drive signal DR to rotate and stop the motor M as well as to direct rotational direction thereof.

The switch input circuit 12 transmits the operation signal ON to the motor control system 7 and the display changer circuit 11 upon receipt of one of the tele signal T and the wide signal W from the up-down switch 1. On the other hand, at the time when both of the tele signal T and the wide signal W are not transmitted to the switch input circuit 12, the circuit 12 outputs the release signal OFF to the motor control system 7 and the timer device 9.

An analogue/digital (A/D) converter 13 receives the voltage signal VZ from the zoom detection resistor 8 and converts the signal VZ to an information data ZP corresponding to the value of the voltage signal VZ.

A calculation process circuit 14a receives the converted information data signal ZP mentioned above, a film count signal FC, a state factor signal STU comprising a plurality of signals and the converter detection signals TC1, TC2 transmitted from the switches SW1, SW2, respectively. The circuit 14a converts these signals to signals which can be input to the display 10, namely a zoom data signal ZD, a count data signal CD and a state data signal SD.

The zoom data signal ZD is calculated by a focal length calculation circuit 14b which calculates the focal length in response to the information data signal ZP and the converter detection signals TC1, TC2 transmitted from the switches SW1, SW2.

The display changer circuit 11 transmits the display signal DSP to the display 10 during the period when it receives the operation signal ON from the switch input circuit 12. Upon receipt of the end signal UP or the release signal OFF, the display changer circuit 11 outputs the count data signal CD as the display data signal DSP.

The film count signal FC and the state signal STU are transmitted from a not shown film counter system and a not shown state monitor system, respectively. The film count system detects the film frame numbers used so far. The state monitor system monitors the state of charging the film cartridge, power and the film advancing.

The lens drive system 6 is constructed in such a way that the mechanical transmission structure thereof has a response delay characteristic so that the zoom lens unit 5 is not driven simultaneously with the manipulation of the up-down switch 1 so that the focal length of the zoom lens unit 5 is not changed by a quick manipulation of the switch 1.

FIG. 2 is an outer perspective view of an example of the camera which is provided with the focal length display device having the abovementioned structure. As illustrated in the drawing, the zoom lens unit 5 is disposed at the center portion of the front side of the camera 3 and the display 10 is disposed at a predetermined portion on the upper body surface.

Figure 3:
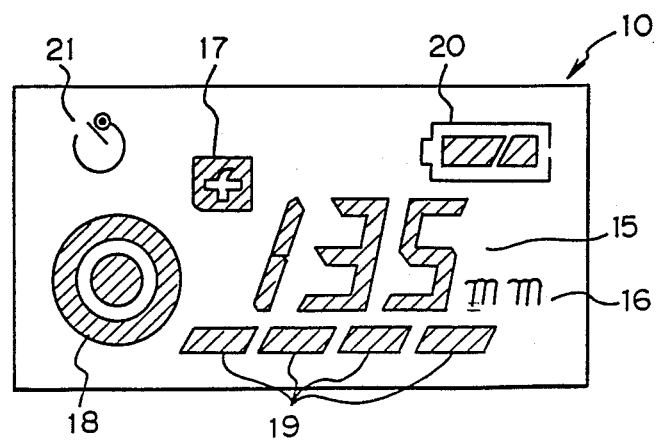
FIG. 3 is an explanatory plan view of a display of the embodiment of the focal length display device of FIG. 1 in a state of displaying a focal length of the camera in use.

The display 10 is illustrated in detail in FIG. 3. As illustrated in FIG. 3, in the display 10 are displayed a focal distance information 15 (displayed as "135" in this example), a unit information 16 (displayed as "mm"), an "f" mark 17 which indicates that the information displayed in the display 10 is on the focal distance, a film cartridge information 18 for indicating whether the film is charged or not, a film feeding information 19 which indicates the state of advancing the film, a battery information 20 for indicating the remaining amount of power of the battery and a self-timer information 21 for indicating the self-timer operation.

The function of the above-mentioned embodiment of the present invention is described hereinafter with reference to the flow chart of FIGS. 4a and 4b.

Figure 4A:
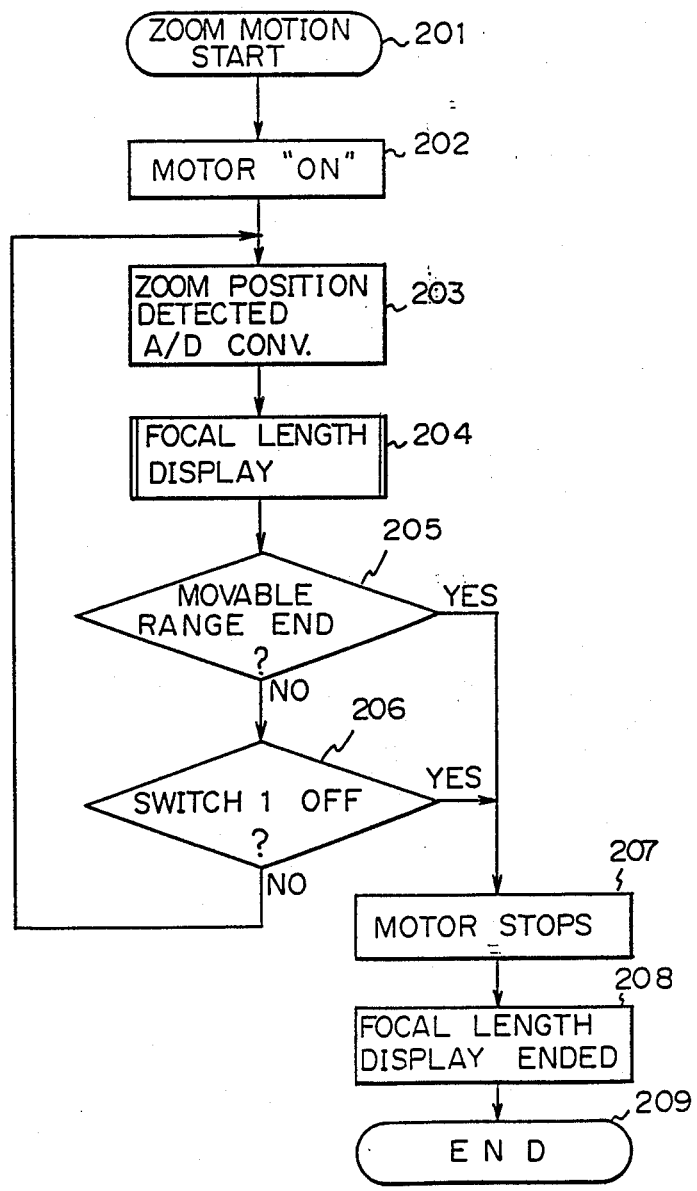
FIG. 4a is a flow chart of a main routine for a displaying process of the focal length in accordance with the embodiment of the focal length display device of FIG. 1.
Figure 4B:
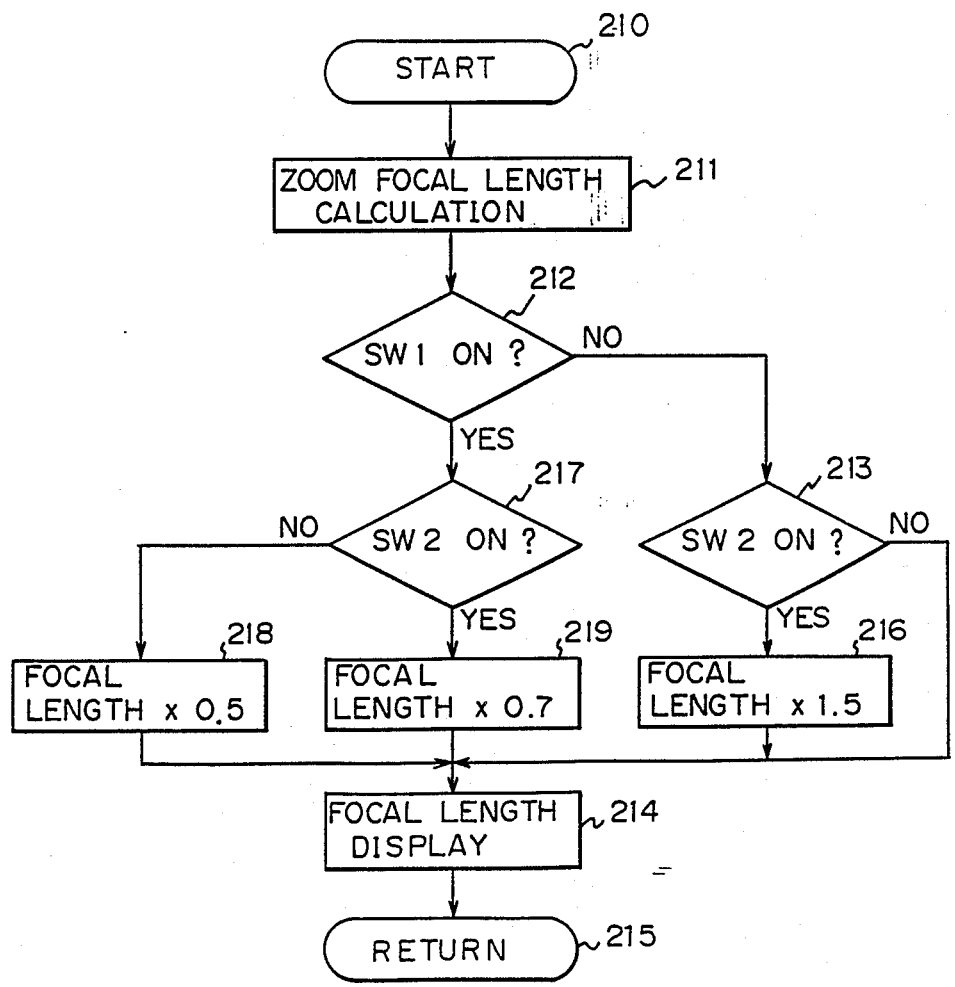
FIG. 4b is a flow chart of a sub-routine for a displaying process of the focal length in accordance with the embodiment of the focal length display device of FIG. 1.

FIG. 4a represents a flow chart of a main routine executed by the CPU 4 and FIG. 4b represents a flow chart of a sub-routine executed by the CPU 4, respectively.

In accordance with the main routine flow chart of FIG. 4a, the functional flow starts from the step of "zoom motion" (step 201). First, an operator manipulates the up-down switch 1 so that the up switch 1a or the down switch 1b is turned on, whereby the tele signal T or the wide signal W is transmitted to the motor control system 7 and the switch input circuit 12 of the CPU 4. Upon receipt of the signal T or W, the circuit 12 transmits the operation signal ON to the motor control system 7 and the display changer circuit 11.

At the same time, the motor control system 7 transmits the drive signal DR to the motor M of the lens drive system 6 so that the motor M is driven to rotate in a direction corresponding to the signal T or W. Accordingly, a current is supplied to the motor M which starts to rotate so that the lens group of the lens unit 5 is driven to shift by the lens drive system 6 (step 202).

When the lens group is moved, the zoom detection resistor 8 generates the voltage signal VZ in response to the zoom position. This signal VZ is transmitted from the resistor 8 to the A/D converter 13 where the signal VZ is converted to a digital data signal ZP corresponding to the analogue amount of the signal VZ (step 203).

After that, the flow moves to the step 204 indicated as "focal distance display". In this step 204, the CPU executes the sub-routine program represente in FIG. 4b.

In accordance with this sub-routine flow, the focal distance display process is started (step 210) and executed as follows.

First, in the step 211 indicated as "zoom focal length calculation", the focal length calculation circuit 14b of the process circuit 14a receives the data signal ZP and calculates the focal length in response to the signal ZP. The calculated focal length data is transmitted to the display changer circuit 11 as the zoom data ZD.

When both of the tele-converter and the wide-converter are not being used, both switches SW1 and SW2 are being turned off. In this case, in the discrimination step 212 where the state whether the switch SW1 is turned on or not is discriminated, the flow is diverged to the exit "NO". Then the flow moves to the subsequent discrimination step 213 where the state whether the switch SW2 is turned on or not. In this step 213, the flow again diverged to the exit "NO" and moves to the step 214 indicated as "focal length display".

In this step 214, the above-mentioned calculation data of focal length is transmitted to the display changer circuit 11 which in turn transmits the display signal DSP to the display 10 so that the numerical value of the focal distance is displayed at the position 15 of the focal length information along with the unit information 16 in the display 10.

As mentioned above, the subroutine flow is proceeded and ended in the step 215 indicated as "return", in the case wherein both switches SW1 and SW2 are being turned off.

By passing through the step 215 of "return" of the sub-routine, the flow passes through the step 204 of "focal length display" of the main routine flow chart and moves to the subsequent discrimination step 205. In this step 205, the state whether or not the zoom lens unit 5 reaches the movable range end of the tele-operation or the wide-operation is discriminated from the displayed information of the focal length displayed in the information display position 15 of the display 10.

When the zoom lens unit 5 does not reach the end of the movable range end of the tele-operation nor that of the wide-operation, the flow proceeds to the subsequent discrimination step 206 where the state whether the up-down switch 1 is still being turned on or not. The switch 1 is checked for the on and off states respectively.

When the swich 1 is not turned off, the flow proceeds back to the step 203 to detect the zoom position again.

On the other hand, when the zoom lens unit 5 reaches the end of the movable range of the tele-operation or the wide-operation, the release signal OFF is transmitted from the switch input circuit 12 to the motor control system 7 and to the timer device 9, respectively, in the step 205.

Also, when the switch 1 is discriminated as being turned off in the step 206, the release signal OFF is similarly transmitted from the switch input circuit 12 to the motor control system 7 and to the timer device 9, respectively.

As a result, the functional flow proceeds to the step 207 wherein the motor control system 7 stops outputting the drive signal DR to the motor M so as to stop the rotation of the motor M.

Also, in this step 207, upon receipt of the release signal OFF, the timer device 9 starts measurement of time and when the measurement result reaches a predetermined value, the timer transmits the end signal UP to the display change circuit 11. By this operation, the circuit 11 stops transmitting the display data signal DSP to the display 10 so that the display process is ended (step 208).

As mentioned above, a series of zoom function is ended so that the execution of the main routine flow by the CPU is ended (step 209).

The sub-routine flow chart of FIG. 4b is further described hereinafter. In this flow chart of FIG. 4b, the process from the step 211 for calculation of the focal length of the zoom lens to the step 214 for displaying the focal length represents the detailed function of sequence conducted in the step 204 of the main routine flow chart of FIG. 4a.

The sequence function in the case wherein no converter is mounted on the camera 3 is already described before. Therefore, the description below refers to the case wherein a tele-converter or a wide-converter is attached to the camera 3.

First, a functional flow in the case wherein a tele-converter 22 of FIG. 5c is attached to the camera 3 is described hereinafter.

In this case, the switch SW1 is turned off while the switch SW2 is turned on. Therefore, the converter detection signal TC1 becomes level "H". Therefore, the flow proceeds the discrimination step 212 of FIG. 4b through the exit "NO" and moves to the subsequent discrimination step 213 in which the state whether the switch SW2 is turned on or not is discriminated.

Since the switch SW2 is turned on by the pin 23b of the converter 22 of FIG. 5c as mentioned above, the switch SW2 outputs the converter detection signal TC2 of level "L". This signal TC2 of level "L" is transmitted to the calculation process circuit 14a in which the focus length calculation circuit 14b executes a calculation of multiplying the focus length of the zoom lens unit 5 by 1.5 which is the magnification of the tele-converter attached to the camera, in the step 216. The calculation result is transmitted from the circuit 14b to the display changer circuit 11 as the zoom data signal ZD in the case wherein the tele-converter 22 of FIG. 5c is attached.

After that, the display changer circuit 11 outputs the display data signal DSP to the display 10 so that the focal length is displayed in the display 10 in the step 214.

Then, through the step 215 of "return", the flow moves to the step 205 of the main routine flow chart of FIG. 4a mentioned above.

The functional sequence of flow in the case wherein a converter of FIG. 5a or 5b is attached to the camera is described hereinafter.

When the converter 22 of FIG. 5a is attached to the camera, the two signal pins 23a and 23b of the converter actuate the switches SW1 and SW2 of the camera 3 to be turned on, respectively, so that the switches SW1 and SW2 output the signal TC1 and TC2, respectively, both signals being of level "L".

On the other hand, when the converter 22 of FIG. 5b is attached to the camera, since the converter 22 of FIG. 5b has only one pin 23a, only the signal TC1 of level "L" is transmitted from the switch SW1.

Accordingly, in the step 212 of the sub-routine flow chart of FIG. 4b, with respect to either converters of FIGS. 5a and 5b, the switch SW1 is turned on so that the flow proceeds the discrimination step 212 through the exit "YES" and moves to the subsequent discrimination step 217 in which the state whether the switch SW2 is turned on or not is discriminated.

When the converter of FIG. 5a attached to the camera is a wide-converter having a magnification of 0.7, the signals TC1 and TC2 are transmitted to the calculation circuit 14a so that the flow proceeds the discrimination step 217 through the exit "YES" and moves to the step 219. In the step 219, the circuit 14b conducts a calculation of multiplying the focal length of the zoom lens unit 5 by 0.7 and outputs the calculation result signal to the display changer circuit 11 as the zoom data signal ZD in the case wherein a wide-converter having a magnification of 0.7 is attached to the camera.

Upon receipt of the signal ZD from the circuit 14b, the display changer circuit 11 outputs the display data signal DSP to the display 10 so that the information of the focal length is displayed in the display 10 (step 214).

After that, through the step 215 of "return", the functional flow moves to the step 205 of the main routine flow chart of FIG. 4a, mentioned above.

Also, with respect to the case wherein the converter of FIG. 5b is attached to the camera, in the process of the discrimination step 217 of the sub-routine flow chart of FIG. 4b, since the switch SW2 is turned off in this case, the switch SW2 outputs the signal TC2 of level "H" which is detected and discriminated so that the flow proceeds the discrimination step 217 through the exit "NO".

The signal TC2 of level "H" is transmitted to the circuit 14a in which the circuit 14b executes the calculation of multiplying the focal length of the zoom lens unit 5 by 0.5 which is the value of the magnification of the wide-converter 22 of FIG. 5b attached to the camera 3, in the step 218.

The calculation result is output from the circuit 14b to the circuit 11 as the zoom data signal ZD for the case wherein the wide-converter of magnification 0.5 is attached to the camera.

After that, the circuit 11 outputs the display data signal DSP to the display 10 which then displays the information of the focal length calculated above (step 214).

After that, through the step 215 of "return", the flow moves to the step 205 of the main routine flow chart of FIG. 4a.

As mentioned above, in accordance with the embodiment of the present invention, the state whether the tele or wide converter is attached to the camera or not is detedted by the switches SW1 and SW2 as well as the kind of the converter so that when the converter is attached to the camera, the focal length of the camera is calculated by the circuit 14b in response to the position of the lens group of the zoom lens unit 5 and the magnification of the converter and that the calculated focal length is displayed by the display 10. Therefore, it becomes possible to display the focal length of the zoom lens unit combined with the converter simply by adding the calculation program. Accordingly, the user can directly confirm the focal length of the camera in either case wherein the tele-converter is used or the wide-converter is used without referring to the manual guide of the converter.

It is to be noted that the present invention is not limited to the embodiment mentioned above but can be modified to realize various variants within the scope of the invention.

For example, the invention can be applied to a camera which is provided with a converter as an inherent component installed therein as well as a camera to which only one of the tele-converter and the wide-converter can be attached.

Also, the magnification of the converter is not limited to 0.5, 0.7 or 1.5 as in the case of the above-mentioned embodiment but may be value such as 0.3, 2, 3 or any desired value other than those mentioned above.

Also, even with respect to the fixed focus length lens, it is convenient to display the focal length of the lens when combined with the tele-converter or wide-converter having a magnification of 1.4, 0.5 or 0.7 which is not so easy to calculate the focal length in mental calculation.

Also, the pull-up resistors R1 and R2 may be installed within the CPU 4 instead of disposed outside of the CPU 4 as is the case of the above-mentioned embodiment.

Also, the converter detection means may comprise either an optical means which detects the installation of the converter on the camera by the interruption of light by the arrangement of the converter or an A/D input port device provided within the CPU 4 instead of the above-mentioned structure of the embodiment of the invention in which the pins 23a and 23b of the converter frame 23 actuate the switches SW1 and SW2 arranged on the camera body side so as to detect and discriminate the converter mounted on the camera.

Figure 7:
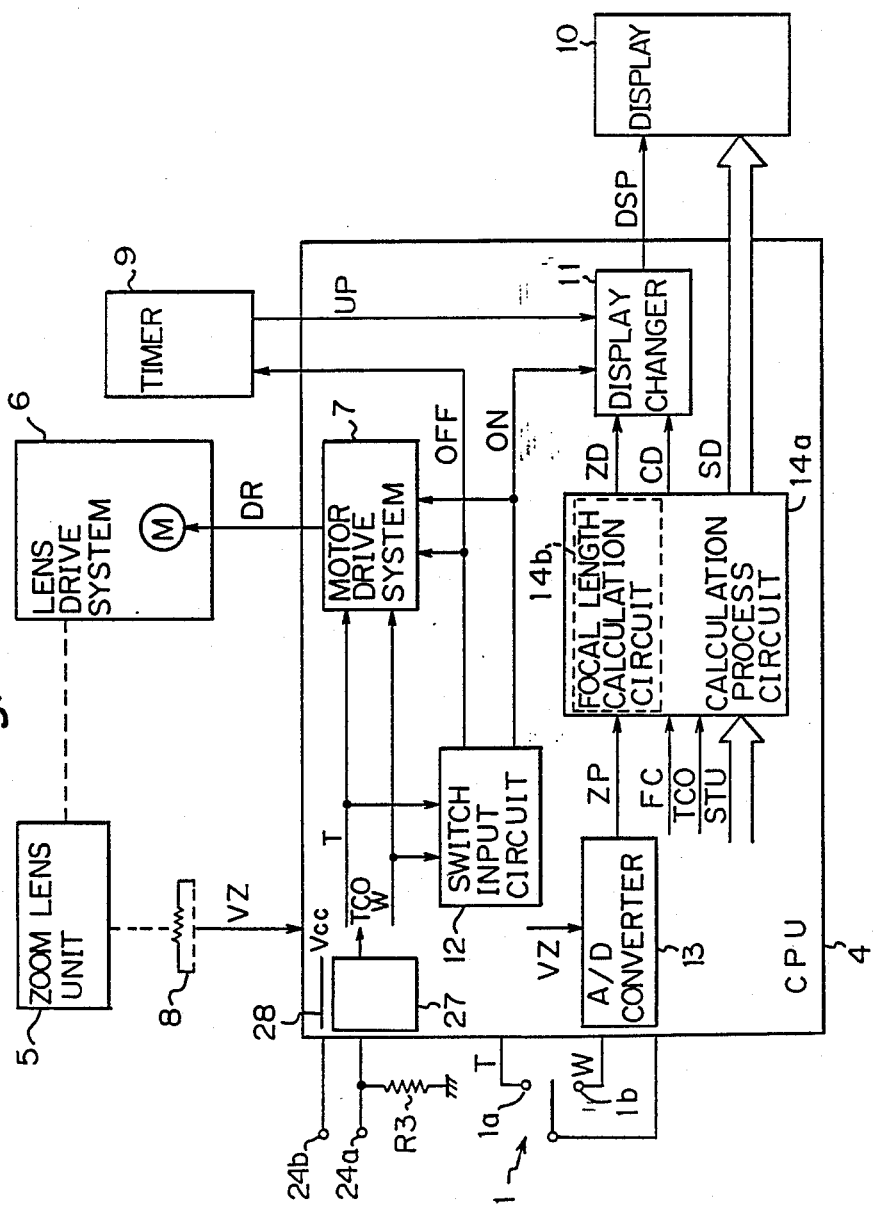
FIG. 7 is a block diagram representing a whole structure of another embodiment of the focal length display device in accordance with the present invention.

FIG. 7 illustrates a whole structure of another embodiment of the present invention in which an A/D input port device provided within the CPU 4 is used for detecting the converter mounted on the camera.

The CPU 4 comprises an A/D input port device 27 which has an input terminal 24a which is grounded through a resistor R3. The input port device 27 has another input terminal 24b which is connected to an electric line 28 arranged within the CPU 4. A power voltage of Vcc is applied to the electric line 28.

Figure 8:
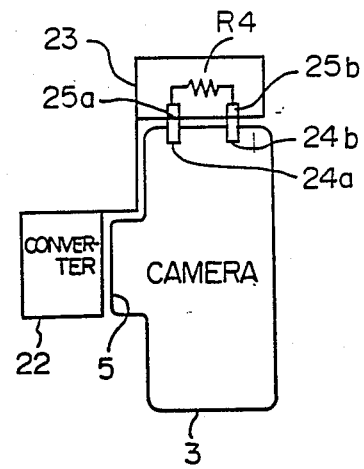
FIG. 8 is a schematic side view of a camera to which a converter attached to the embodiment of FIG. 7 is applied.

The input terminals 24a and 24b are arranged in such a way that a resistor is connected between the terminals 24a and 24b when the converter is attached to the camera, as illustrated in FIG. 8 described later.

This resistor is disposed on the frame 23 for attaching the converter 22. The input terminals 24a and 24b are lead from the input port device 27 to the upper surface of the camera 3 in the drawing as illustrated in FIG. 8. The frame 23 has output terminals described later which are connected to the terminals 24a and 24b, respectively, when the converter is attached to the camera.

Figure 9A:
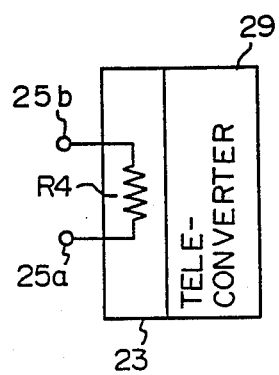
FIG. 9a is an explanatory circuit diagram representing an example of the structure of FIG. 8 when the converter thereof is a tele-converter.
Figure 9B:
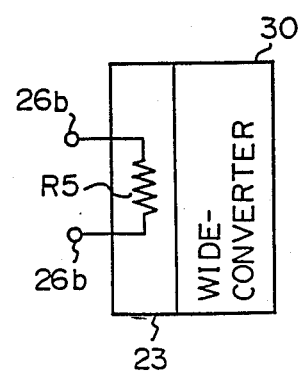
FIG. 9b is an explanatory circuit diagram representing another example of the structure of FIG. 8 when the converter thereof is a wide-converter.

The output terminals are illustrated in FIGS. 9a and 9b. FIG. 9a illustrates a tele-converter 29 having a frame 23 to which output terminals 25a and 25b are attached. A resistor R4 is arranged between the terminals 25a and 25b.

The output terminals 25a and 24b are connected to the input terminals 24a and 24b of the CPU 4 illustrated in FIG. 7, respectively, so that the resistors R3 and R4 are connected in series between the power line 28 and the ground whereby a voltage divided from the power voltage of Vcc by the resistors R3 and R4 is applied to the A/D input port device 27 installed within the CPU 4.

On the other hand, FIG. 9b illustrates a wide-converter 30 having a frame 23 to which output terminals 26a and 26b are attached. A resistor R5 is arranged between the terminals 26a and 26b.

When the converter 30 is attached to the camera 3, in a manner similar to that of FIG. 8, the output terminals 26a and 26b are connected to the input terminals 24a and 24b, respectively, so that the resistors R3 and R5 are connected in series between the power line 28 and the ground whereby a voltage divided from the power voltage of Vcc by the resistors R3 and R5 is applied to the A/D input port device 27 installed within the CPU 4.

In accordance with this particular embodiment, it is arranged in such a way that the resistance of the resistor R4 is smaller than that of the resistor R, i.e., R4<R5 so that the analogue data input to the input port device 27 differs according as either the resistor R4 is connected or the resistor R5 is connected. Thereby, it becomes possible to discriminate from the output signal TC0 transmitted from the input port device 27 to the calculation process circuit 14a whether the converter attached to the camera 3 is the tele-converter 29 or the wide-converter 30.

The following table-2 represents an example of method for discriminating the tele-converter 29 and the wide-converter 30 from the A/D input data signal.

TABLE 2

| A/D input data $\geq$ 128 | A/D input data $<$ 128 |
|---|---|
| tele-converter | wide-converter |

Figure 10:
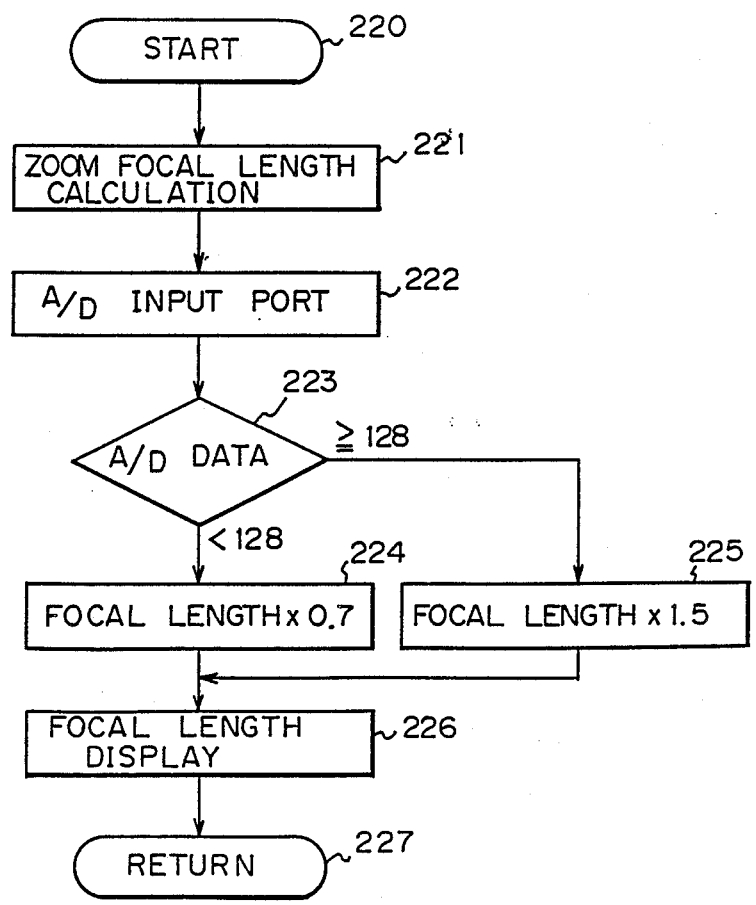
FIG. 10 is a flow chart of a sub-routine of a focal length display process of the display device of the camera to which the converter of FIG. 8 is attached.

FIG. 10 is a flow chart of the discrimination process for discriminating whether the converter 22 attached to the camera 3 is the tele-converter 29 or the wide-converter 30.

The flow chart of FIG. 10 represents a sub-routine corresponding to the sub-routine of FIG. 4b and substitutes for the step 204 for displaying the focal length of the main routine of FIG. 4a.

When the functional flow reaches the step 204 of the main routine of FIG. 4a, the sub-routine of FIG. 10 is started (step 220).

First, in the step 221, the circuit 14b of the calculation process circuit 14a illustrated in FIG. 7 receives the magnification data signal ZP and calculates the focal length as mentioned before. The calculation result is transmitted from the circuit 14b to the display changer circuit 11 as the zoom data signal ZD.

It is to be noted that when the tele-converter 29 or the wide-converter 30 is attached to the camera 3, the output terminals 25a and 25b or 26a and 26b are connected to the input terminals 24a and 24b of the input port device 27 installed within the CPU 4, respectively, so that the resistors R3 and R4 or R3 and R5 are connected in series between the power line 28 and the ground as mentioned before.

As a result, in the subsequent step 222, an analogue data of voltage divided from the power voltage Vcc by the resistors R3 and R4 or R3 and R5 is applied to the A/D input port device 27 which convert the analogue data to a digital data and outputs the digital data to the calculation process circuit 14a as the output signal TC0.

The circuit 14a discriminates the digital data signal whether the data is smaller than 128 or not, in the discrimination step 223.

If the data is larger than 128, the state is discriminated as the tele-converter 29 of FIG. 9a is attached to the camera 3 so that the output terminals 25a and 25b are connected to the input terminals 24a and 24b of the input port device 27, respectively and that the device 27 receives the analogue data corresponding to the voltage divided from the power voltage Vcc by the resistors R3 and R4.

When the digital data is larger than 128 as mentioned above, the flow proceeds to the step 225 where the calculation circuit 14b executes the calculation of multiplying the focal length of the zoom lens unit 5 by 1.5 which is the magnification of the tele-converter 29 attached to the camera 3. The calculation result is transmitted from the circuit 14b to the display changer circuit 11 as the tele-converter attached zoom lens data ZD, as in the case of FIG. 4b.

After that, the display data signal DSP is transmitted from the circuit 11 to the display 10 so that the information data of focal length is displayed in the display 10 in the step 226.

After that, through the step 227 of "return", the flow proceeds to the step 205 of the main routine of FIG. 4a.

On the other hand, if the digital data is smaller than 128 in the discrimination step 223 of the sub-routine of FIG. 10, the state is discriminated as the wide-converter 30 of FIG. 9b is attached to the camera 3 so that the output terminals 26a and 26b of the converter 30 are connected to the input terminals 24a and 24b of the camera side and that the analogue data corresponding to the voltage divided from the power voltage Vcc by the resistors R3 and R5 is applied to the input port device 27. In this case, the flow proceeds to the step 224 where the calculation circuit 14b executes the calculation of multiplying the focal length of the zoom lens unit 5 by 0.7 which is the magnification of the wide-converter 30 attached to the camera 3. The calculation result is transmitted from the circuit 14b to the display changer circuit 11 as the wide-converter attached zoom lens data signal ZD.

Upon receipt of this data signal ZD, the circuit 11 transmits the display data signal DSP to the display 10 so that the focal length information is displayed by the display 10 in the step 226 of FIG. 10.

After that, through the step 227 of "return", the flow moves to the step 205 of the main routine flow chart of FIG. 4a mentioned above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focal length display device of a camera comprising:
   a zoom lens unit which comprises a group of lenses disposed on a same optical axis;
   a drive means for driving said group of lenses of said zoom lens unit;
   a lens position detection means which detects a position of said group of lenses and outputs a signal of information data on said position of the lens group;
   an information signal converter means for converting said information data signal to a digital signal;
   a converter detection means for detecting a state whether an optical converter having a magnification is attached to said zoom lens unit;
   a focal length calculation means for calculating the focal length in such a way that, when said converter detection means detects the state in which said optical converter is not attached to said zoom lens unit, the focal length is calculated in response to said digital signal from said information signal converter means, while when said converter detection means detects the state in which said optical converter is attached to said zoom lens unit, the focal length is calculated in response to said digital signal from said information signal converter means and said magnification of said optical converter; and
   a display means for displaying said focal length calculated by said calculation means.

2. A focal length display device of a camera according to claim 1, wherein said optical converter has a frame to be attached to the camera, said frame having one or more pins according to a kind of said optical converter so as to actuate corresponding switches provided at predetermined positions on the camera side, whereby enabling to discriminate the state of installation of said optical converter and the kind thereof.

3. A focal length display device of a camera according to claim 1, wherein said optical converter has a frame to be attached to the camera, wherein a resistor having a resistance according to a kind of said converter is provided within said frame and wherein the camera comprises an A/D input port device installed within a CPU thereof and having a resistor connected to the ground and a power line of a predetermined voltage, said resistors of said converter and said input port device dividing said voltage of said power line, whereby from the divided voltage, enabling to discriminate the state of installation of said optical converter and the kind thereof.

* * * * *